United States Patent Office 2,815,221
Patented Dec. 3, 1957

2,815,221

SUSPENSION ASSEMBLY FOR MAINTAINING VEHICLE BODY AT A SELECTED LEVEL INDEPENDENT OF LOAD

Lucien Peras, Billancourt, France, assignor to Regie Nationale des Usines Renault, Billancourt, France Application November 7, 1955, Serial No. 545,578

Claims priority, application France November 24, 1954

7 Claims. (Cl. 280—124)

The invention relates to a suspension for a vehicle, and more particularly a suspension wherein the suspended part of the body of the vehicle is capable of being maintained at a distance from the ground which is independent of load.

The invention consists essentially of a suspension of the type according to which the wheels are supported by arms articulated to the body, the latter furthermore bearing against these arms by way of springs, this suspension comprising members applying to the point of articulation of each arm such a force as to balance to a large extent the supporting reaction, and the point of articulation of each arm to the body is made movable in such a way as to allow compensation for variation in height of the spring, and to restore the body to a constant height in relation to the ground when the load has been altered.

For this purpose, a displacement mechanism is provided, capable of acting on the point of articulation, and of displacing it as regards height, in order to restore the body to the level chosen after the load has been altered, and on the other hand a locking mechanism is provided, capable of being freed at will by the driver, in order to maintain the point of articulation at this suitable height. These mechanisms can be controlled by mechanical, hydraulic or other means.

In order to allow the driver to check the compression of the springs under load, and the variation in height of the body in relation to the ground, two indicators can advantageously be situated within the driver's view, one indicating the degree of compression of the spring, and the other variation in height of the point of articulation, such that when they are facing one another the distance of the body from the ground takes up the desired value.

According to a particular form of embodiment, the articulating arm is suspended by a system of levers articulated to a torsion bar which has been subjected to preliminary torsion in such a way as to provide at the point of articulation a force balancing load reaction at this point.

The invention will now be described with reference to certain forms of embodiment represented by way of example in the attached drawing, wherein.

Figure 1:
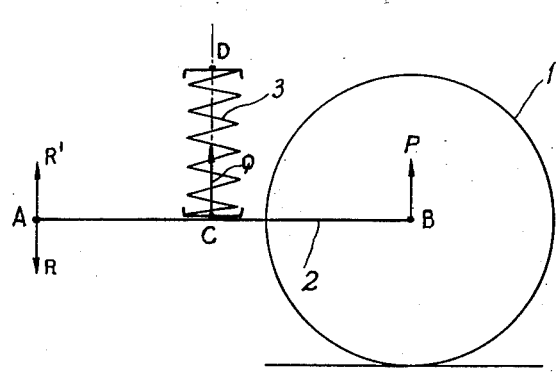
Fig. 1 is a diagrammatic representation in principle.

With reference to Fig. 1, this diagrammatically represents a suspension of the usual type wherein the wheel 1 is suspended at B on an arm 2, the latter being articulated at A to the body, and receiving the pressure of a vertical spring 3 at C, which abuts at D against the body. Ground reaction P determines a pressure Q on the spring, and an action R at A on the body.

If it is supposed that the load on the vehicle increases, the reaction P increases together with the pressure Q, and the spring is compressed, which lowers the points A and D which are fast with the body.

The invention consists essentially in using at A an articulation capable of being vertically displaced and maintained substantially in balance by an elastic device producing at A a reaction R' substantially equal to the action R.

In these circumstances, it is possible to lock the point of articulation A to the body by means of a mechanism of low resistance, and only opposing the dynamic variations of R, and to displace the point A, once locked, by means of suitable members directly controlled by the driver or automatically.

In order to allow the driver to evaluate the new position which the point of articulation is to be caused to take up, two indicators are provided, for example, in view of the driver, and moved, for example, by Bowden cables, one being connected to the variation in length of the spring, and the other to the variation in height of the point A, so that when they are facing one another the distance of the point D from the ground has a constant predetermined value.

Figure 2:
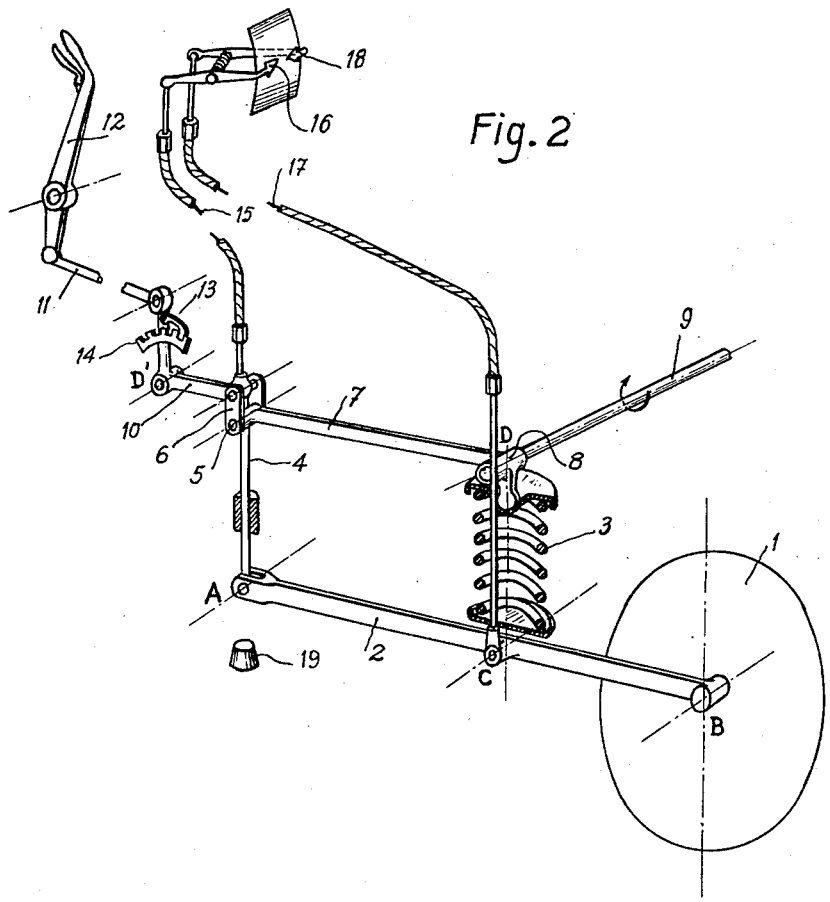
Fig. 2 is a perspective view of a form of embodiment according to the diagram in Fig. 1.

An example of an embodiment of this kind is represented in Fig. 2: the articulating arm 2 supporting the wheel is articulated at A, and receives the load due to the weight of the vehicle at C by way of the spring 3. As will be seen, the arm is supported at A by a bell crank lever 4, which is pivoted at 5 on a yoke 6, and the branch 7 of this lever extends in a direction approximately parallel to that of the arm 2 as far as the point D, where it grips a torsion bar 9 by means of a sleeve 8.

In order to allow adjustment as to height of the point A, the yoke 6 is supported by a second bell crank lever 10 actuated by a rod system 11, for example, by means of a lever 12. Locking is obtained by a pawl 13 carried by the lever 10 and co-operating with a castellated piece 14, the pawl being freed from the notches in any suitable manner.

Finally, the yoke 6 is connected by a cable 15 to an indicator 16, and similarly the arm 2 is connected at the point C by a cable to an index 18, as represented in Fig. 2.

Thus, when the spring yields in consequence of an increase in load, causing the body of the vehicle to move downwards, the indicator 18 which measures the degree of spring compression is displaced; the driver can operate the lever 12, and after unlocking the pawl 13 can operate the lever 10 in order to move the point of articulation A, which is assisted by the torsion bar 9; an abutment 19 limits the amplitude of movement of the articulation A. When the body has returned to a suitable level, which will be indicated, for example, by agreement of the two indicators 16 and 18, the driver locks the lever 10 in its new position, and consequently likewise the point A.

Figure 3:
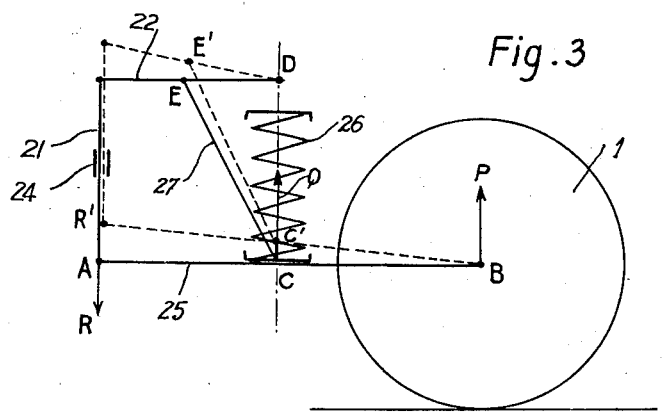
Fig. 3 is a diagrammatic representation in principle of another form of embodiment.
Figure 4:
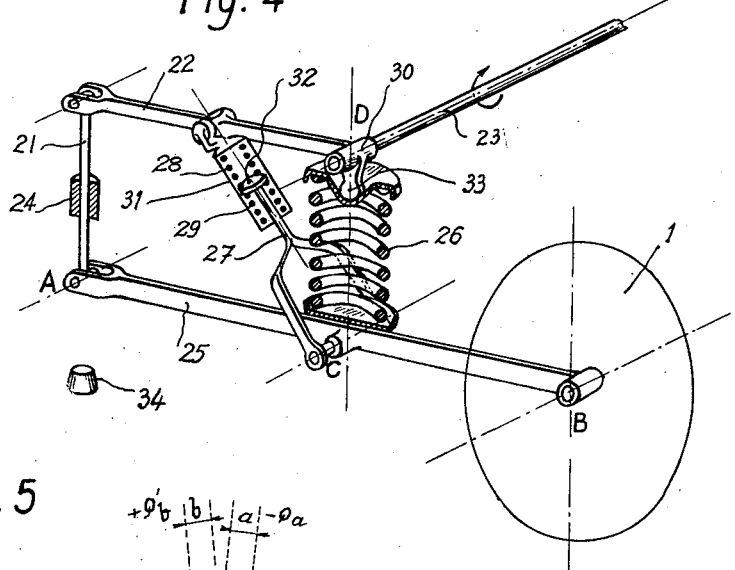
Fig. 4 is a perspective view of a form of embodiment according to the diagram in Fig. 3.

With reference to Figs. 3 and 4, these illustrate diagrammatically another form of embodiment according to the invention, wherein it is sufficient for the driver to free and then lock the point of articulation A in order to obtain the desired height.

In this arrangement, the point of articulation A of the arm is suspended with the help of an articulated link system 21, 22 from a torsion bar 23. The latter is subjected to preliminary torsion in such a way as to provide, by way of the link 22 and the rod 21 sliding in a guide 24, a force R' at the point A on the arm 25 which will be in the opposite direction to the reaction R, and of approximately equal value.

In order to ensure lifting of the arm 25 in accordance with compression of the spring 26, an inclined link 27 connecting the arm 25 to the link 22 is provided according to the invention, this inclined link extending in the present embodiment from the pont C at the base of the spring to a suitably chosen point on the link 22.

The load of the body is transmitted to the spring by a collar 30 fitted at the end of the link 22, the torsion bar 23 being forced into this collar. When the spring shortens in consequence of an increase in load, supposing the point of articulation A to be unlocked and the link 27 to be first of all of constant length, it will be seen from Fig. 3, where two positions of the point A are represented, that the latter tends to straighten up the link 22 by rotation about the torsion bar, and by way of the rod 21 and likewise the arm 25, so that the position of the point D finally remains unchanged, and that the resulting modification consists in moving the point A as far as a position determined by the shortening or lengthening of the spring 16.

Nevertheless, if the link 27 were of constant length, it would have to be omitted after locking the point of articulation A in its new position, since there would then be a non-deformable system cutting out the suspension. It is consequently advantageous to have a link 27 elastically deformable as regards length; this is embodied in the example illustrated by means of two opposed springs 28 and 29 enclosed in a cylinder 31 articulated to the link 22 and acting on the piston 32 which terminates the forked link 27 articulated at 6 to the link 25.

In this way, it is possible suitably to adjust the position of the point of articulation A (which must subsequently be locked by means of suitable members not shown) and also to obtain operation with variable flexiblity by means of certain arrangements relating to the springs 28 and 29, which have to abut against the extension for a mean position of the plate 32, and themselves to have non-linear characteristic, flexibility being great in the precise and limited zone of static load, and decreasing with movement away from this zone.

It will also be noticed that when the force R' opposing the force R at the point A is provided by a torsion bar disposed in the manner represented in the figure, movement of the point A causes reduction of the torque in question, while the action R increases.

Figure 5:
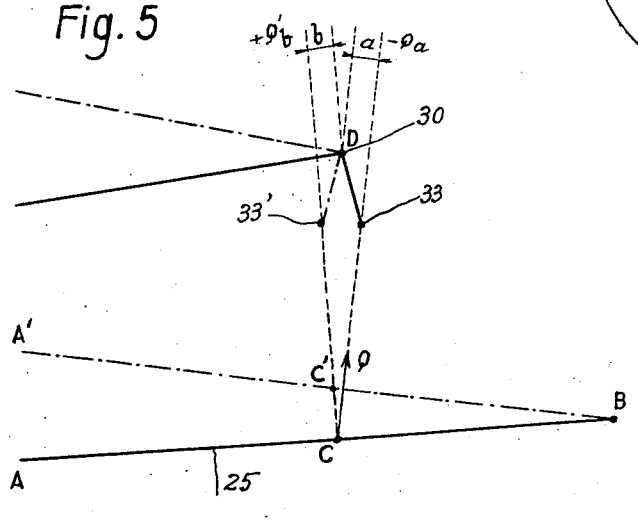
Fig. 5 is a diagram illustrating an operating detail.

This disadvantage can be remedied by providing the collar 30 with a finger 33 at right angles to the link 22, by means of which pressure is brought to bear on the spring. It is possible to ensure in this way that when the collar 30 turns, the axis of the spring no longer passes through the axis of the torsion bar, which introduces a corrective torque adding to that of the torsion bar, as will readily be seen from the explanatory diagram in Fig. 5. It will be seen from this figure that the corrective torque provided by the suspension spring passes from a negative value $-Qa$ to a value $+Qb$ when the finger 33 passes from the position 33 to the position 33' after an increase in load. This allows an increase in the force opposing R to be obtained.

I claim:

1. In a resilient suspension assembly for vehicles having a body and at least one wheel, in combination an arm pivotally connected to the wheel, means pivotally connected to the arm at a predetermined point on the arm, said means being pivotally connected to the body, a compressible and extensible member sensitive to the load in the vehicle and bearing on the arm between the wheel and said predetermined point on the arm, means for raising and lowering said predetermined point on the arm relative to the pivotal connection of the arm to the wheel and for releasably holding the arm in a selected position relative to said pivotal connection, said means pivotally connected to the arm including a member connected for applying a force to said arm when free to move relative to said pivotal connection, the force having a component acting on said predetermined point on the arm in a direction opposite and substantially equal in value to a reaction component of a vertical force component generated between the arm and the wheel, whereby the body of the vehicle can be readily maintained at a selected vertical distance relative to a point on which said wheel rests regardless of the load on the vehicle.

2. In a suspension assembly according to claim 1, including means for indicating the amount of compression of said compressible and extensible member and for indicating the height of said predetermined point on the arm relative to the point on which said wheel rests.

3. In a suspension assembly according to claim 1 in which said compressible and extensible member comprises a suspension spring.

4. In a suspension assembly according to claim 1, in which said means for raising and lowering said predetermined point on the arm comprises driver-actuated links and a releasable locking mechanism.

5. In a suspension assembly according to claim 1, in which said member connected for applying a force to the arm includes a torque bar having an initial predetermined torsional stress applied thereto directed in a predetermined direction tending to urge said predetermined point on the arm in an upwardly direction, whereby when said arm is free to move and a variation in the load on the vehicle takes place the compressible and extensible member is compressed and said predetermined point on the arm is urged upwardly tending to maintain the vehicle body in substantially a constant height in relation to the point on which said wheel rests.

6. In a resilient suspension assembly according to claim 1, in which said means pivotally connected to the arm including a member connected for applying a force to said arm further includes a link operably connected to said force applying member and a resilient link connected between the arm and said first mentioned link, whereby the suspension assembly is resilient when said compressible and extensible member is in a compressed state due to a heavy load on the vehicle and said arm is held in a selected position, the resilient link being extensible in a direction so as to cooperate with said force applying member.

7. In a resilient suspension assembly according to claim 1, in which said compressible and extensible member has a longitudinal axis and is compressed and extends in directions parallel to said axis, and in which said force applying member comprises a pre-stressed torque bar comprising a collar connected to said torque bar and moving therewith, said collar having an extension fixed thereto and movable between planes coinciding with said longitudinal axis and planes intersecting with a plane in which said longitudinal axis is disposed, whereby said compressible and extensible member cooperates with said torque bar when said extension lies in a plane between said longitudinal axis and said predetermined point on the arm and said plane intersects the plane in which said longitudinal axis is disposed.

References Cited in the file of this patent

UNITED STATES PATENTS 2,568,261     Stade _____ Sept. 18, 1951